United States Patent
Mink et al.

(10) Patent No.: US 12,443,331 B2
(45) Date of Patent: Oct. 14, 2025

(54) MEDITATION TOOL WITH COORDINATED VISUAL AND AUDITORY STIMULATION

(71) Applicant: SPINNING MANDALAS LLC, Fountain, CO (US)

(72) Inventors: Johnathon Mink, Florence, CO (US); Michael Casagranda, Florence, CO (US)

(73) Assignee: Spinning Mandalas LLC, Florence, CO (US)

( * ) Notice: Subject to any disclaimer, the term of this patent is extended or adjusted under 35 U.S.C. 154(b) by 170 days.

(21) Appl. No.: 18/499,550

(22) Filed: Nov. 1, 2023

(65) Prior Publication Data

US 2024/0143136 A1    May 2, 2024

Related U.S. Application Data

(60) Provisional application No. 63/381,844, filed on Nov. 1, 2022.

(51) Int. Cl.

| | |
|---|---|
| *G06F 3/048* | (2013.01) |
| *G06F 3/04817* | (2022.01) |
| *G06F 3/0482* | (2013.01) |
| *G06F 3/0484* | (2022.01) |
| *G06F 16/44* | (2019.01) |
| *G06T 11/00* | (2006.01) |
| *G06T 13/20* | (2011.01) |

(Continued)

(52) U.S. Cl.
CPC ........ *G06F 3/0482* (2013.01); *G06F 3/04817* (2013.01); *G06F 3/0484* (2013.01); *G06F 16/44* (2019.01); *G06T 11/00* (2013.01); *G06T 13/205* (2013.01); *G06T 13/80* (2013.01); *H04S 3/008* (2013.01); *G06T 2200/24* (2013.01); *H04S 2400/01* (2013.01)

(58) Field of Classification Search
None
See application file for complete search history.

(56) References Cited

U.S. PATENT DOCUMENTS

| | | | |
|---|---|---|---|
| 2015/0093733 A1* | 4/2015 | Surve | G09B 5/02 434/262 |
| 2015/0359070 A1* | 12/2015 | Mead | H05B 47/155 315/154 |

(Continued)

*Primary Examiner* — Thanh T Vu
(74) *Attorney, Agent, or Firm* — Martensen IP; Chad G. Clark (57) ABSTRACT

Disclosed is a multimedia system for meditation practice comprising a graphical user interface (GUI), a multichannel audio output device and computer-executable instructions to receive from a user an activation target, to determine mandala graphics and binaural beat audio works associated with the target, prompt and receive from the user a selected mandala graphic and audio work, and present to the user a meditation program featuring the audio work and the mandala having a spin rate coordinated with the audio work. Also disclosed is a method of meditation practice comprising use of a software application to select an activation target, an associated mandala, and an associated binaural beat audio work. Where the software application generates and presents a meditation program to affect the activation target by playing the selected audio work and displaying the selected mandala rotating at a rate coordinated with the audio work.

20 Claims, 9 Drawing Sheets

(51) Int. Cl.
*G06T 13/80* (2011.01)
*H04S 3/00* (2006.01)

(56) References Cited

U.S. PATENT DOCUMENTS

| | | | |
|---|---|---|---|
| 2016/0144150 A1* | 5/2016 | Berg | A61B 5/486 |
| | | | 600/28 |
| 2022/0296917 A1* | 9/2022 | Avice | A61N 5/0618 |
| 2025/0050055 A1* | 2/2025 | Hernández | H04N 23/63 |

* cited by examiner

MEDITATION TOOL WITH COORDINATED VISUAL AND AUDITORY STIMULATION

CROSS-REFERENCE TO RELATED APPLICATIONS

This application claims priority to U.S. Provisional Application No. 63/381,844, filed Nov. 1, 2022, which is hereby incorporated by reference herein in its entirety.

BACKGROUND OF THE INVENTION

Field of the Invention

Embodiments of the present invention relate, in general, to systems and methods that facilitate meditation through use of interacting binaural sound patterns and rotating visual patterns.

Relevant Background

In the disclosed invention, new meditative experiences are unlocked and the effectiveness of known techniques is improved by use of systems and methods that access human energy systems through precisely coordinated binaural sound patterns and rotating visual patterns as implemented via a mobile software application or online software course.

The disclosed meditation techniques rely at least in part on concepts of Tantric chakras and other traditional human energy systems that originate in Indian religions and other cultural traditions. With respect to Tantra and similar systems practiced by various cultures, their effectiveness must consider "psychosocial factors" not typically considered in scientific medicine. Such traditional medical practices relied on a "psychosocial mobilization of the patient's biochemical response system." Further, Tantra and similar systems generally assume a unitary model of the human organism, wherein the mind and body are inextricably linked, rather than regarded as separate and unrelated spheres. Such a "non-reductionist theory of medical effectiveness" helps explain the observed improvements in the meditation experience promoted by the disclosed methods and systems, which may at first glance appear outside the explanatory powers of scientific medicine. See *Current Anthropology*, The University of Chicago Press, Vol. 20, No. 1. Pp. 59-80 (March 1979). Further, Tantra and modern medical techniques may access and act upon the same underlying processes of the body, since "considerable similarities exist between ancient concepts of the life force and modern biofield concepts in their assumption that a form of life-giving energy flows throughout the body and that illness arises as a result of blockages, excesses, or irregularities in its flow." See https://www.faim.org/measurement-of-the-human-biofield-and-other-energetic-instruments. There is a substantial body of empirical research demonstrating the efficacy of targeting Tantric energy modalities to improve human well-being. There have been other systems to implement or improve meditation practice based on using Tantric and other human energy manipulation.

Figure 1:
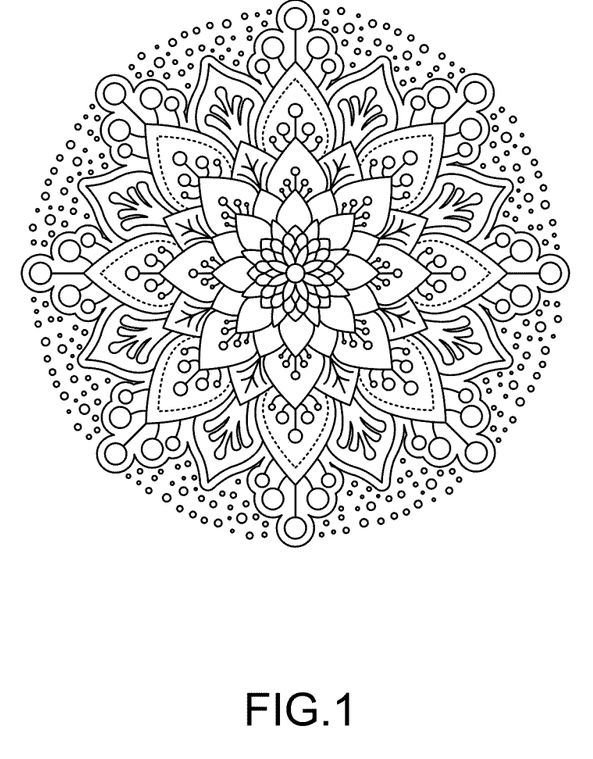
FIG. 1 depicts an example mandala as known in existing meditation techniques.

Meditation by use of rotating visual patterns is also known, as is meditation by use of rotating mandalas. As used herein, a mandala is a visual representation that is roughly point symmetrical and is comprised of a plurality of rings or layers organized around a central focal point. See FIG. 1. Mandalas have similar repeating elements arranged into concentric circles, and when the mandala is rotated around its central point, the elements blur and visual harmonies emerge at different rates of rotation. Use of mandalas as sacred art and meditation aids originated in Hindu and Buddhist practice several hundred years ago. Mandalas may be constructed to symbolize many things, e.g., wisdom, enlightenment, or an individual's inner spirituality. Further, mandalas can represent many different perspectives, e.g., the solar system imagined from overhead can be visualized as a mandala, or DNA cut and flattened into two dimensions. As used in existing meditation systems, mandalas are typically rotated as a single piece, and their rate of rotation is not precisely controlled. Such use has limited ability to produce meditative visual patterns, and is not easily coordinated with sound therapy.

Meditation incorporating sound therapy, and in particular the observed phenomenon known as binaural beats is also known. A binaural beat is an auditory illusion that humans perceive when different pure tone sine wave sounds are presented to each ear. For example, if a person's left ear is presented with a tone of 600 Hertz (Hz), and the person's right ear is presented with a tone of 570 Hz, the person will imagine a third tone having frequency of 30 Hz. According to certain studies, binaural beat frequencies ranging from 1 Hz to 30 Hz are resonant with and can establish the same brainwave frequencies experienced by individuals during meditation. Existing meditation and behavioral therapy techniques using binaural beats, however, are typically used as an ancillary means of inducing a meditative state, and are not coordinated with resonant visual patterns supplied by mandalas.

To summarize, existing meditation techniques and practices that seek to activate Tantric chakras or other human energy systems are not combined with visual mandala patterns and binaural beat patterns. Further, existing meditation techniques do not leverage precisely coordinated sound and visual therapy in the form of binaural beats and rotating mandalas to activate human energy systems.

It would therefore be desirable to have a guided meditation system that was coherent, convenient, and easy to use, and that had the capacity to leverage multiple different human energy modalities concurrently. Further, it would be desirable to use binaural beats and precisely coordinated visual stimulation to implement these meditation experiences. The disclosed methods and systems leverage available computing and software techniques to provide novel applications of binaural beats and resonant visual stimulation to provide customized routines that powerfully and efficiently facilitate meditation experiences. The disclosed invention represents a substantial improvement over existing multimedia meditation systems and methods.

The absence of meditation techniques that combine these three powerful elements can be explained in part by recent developments in mobile computing and networking technology. Through use of readily available mobile computing power, mandala visual graphics can be developed that provide intricate visual elements, harmonics, and symmetries, and precise control of each concentric circle of a mandala graphic. Where before mandalas were rotated as a whole, now each concentric circle can rotate at a precise speed and direction to produce desired resonant visual effects. Further, the rotation of such visual elements can be synchronized and coordinated with binaural sound effects to produce comprehensive effects on the individual. Such effects can be tuned to activate Tantric chakras, or may unlock other psychological benefits for the practitioner. Mobile computing also allows the previously unavailable storage and manipulation of a vast library of mandala shapes, colors, and elements. Similarly, a library of binaural sound effects can be easily produced and stored, and conveniently provided through use of headphones or multichannel audio effects to each ear. Through the disclosed invention, such libraries can also be paired with a comprehensive library of activation targets associated with Tantric and other human energy systems, including chakra frequencies, color characteristics, and desired psychosomatic effects. The coordination and implementation of these combined elements was previously unavailable to meditation practitioners, and represents significantly more than a mere software implementation of conventional meditation practice.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures imbedded in the text below and attached following this description.

The Figures imbedded and attached depict embodiments of the present invention for purposes of illustration only. One skilled in the art will readily recognize from the following discussion that alternative embodiments of the structures and methods illustrated herein may be employed without departing from the principles of the invention described herein.

DEFINITIONS

As used herein, a chakra is a focal point for human energy that originated in traditional Hindu meditation practices. Chakras may be associated with locations on or in the human body, meridians, colors, and frequencies. See FIG. 2.

As used herein, frequency means either a frequency or range of frequencies associated with, or that achieves an effect upon, an energy center or chakra, a meridian, an organ, or a behavioral or emotional state. Frequency may also mean a frequency of sound wave propagation or a rotational rate.

DETAILED DESCRIPTION OF THE INVENTION

The detailed description of the present invention will be primarily, but not entirely, limited to systems and methods for improving human meditation practice that incorporate extensive academic study and instructional experience. Further, this invention leverages computing technology to synthesize previously fragmented elements into one system of meditation, and creates a coordinated visual and auditory experience previously unavailable to practitioners.

The disclosed invention uses coordinated, resonant binaural beats and complex rotating mandalas to activate Tantric chakras, but may also unlock more contemporary insights. Carl Jung believed in the power of mandalas to benefit his patients, and thought that creating mandalas offered a "safe refuge of inner reconciliation and wholeness." Mandalas can be seen as archetypal symbols that represent the Jungian Self and become a therapeutic tool to illustrate and facilitate the individuation process. Therefore, a rotating mandala becomes a tool and a symbol for understanding oneself and being conscious of one's own psychology, helping individuals maintain this understanding in a mindful state throughout their life.

The techniques disclosed herein are implemented through a system comprising software running in a mobile application hosted on a smartphone, laptop, tablet, desktop, or other computing device, and in some embodiments may be complemented by use of a wearable device. On-line data analysis and storage, as well as online live or recorded meditation programs may also be included. A multi-channel sound system including earphones, earbuds, headphones, surround sound, or other suitable speakers is also required. The system facilitates meditation by combining binaural beat therapy with visual therapy to enhance the meditative experience for practitioners of the techniques.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Like numbers refer to like elements throughout. In the figures, the sizes of certain lines, layers, components, elements, or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a nonexclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Binaural Beats Sound Therapy

The disclosed meditation tool relies on two interacting sensory stimuli. The first an auditory stimulus known as binaural beats, and the second is a coordinated visual stimulus comprised of rotating mandalas. As used herein, a binaural beat is an illusion that a listener perceives when two different pure-tone sine waves, both with frequencies lower than 1500 cycles per second (Hz), and having a difference between them less than 40 Hz, are presented to the listener, one through each ear. When presented with such coordinated frequencies to each ear, the resonance between the frequencies causes the listener to imagine hearing a beat pattern with a frequency equal to the difference between the two tones. Meditation practitioners use binaural beats to alter consciousness in a way that eases the symptoms of stress, anxiety, and depression, and improves focus relaxation, sleep, and depth of meditation.

The pair of frequencies directed to the ears is selected to establish a specific beat frequency, which interacts with different body and brain functions. For example, with further reference to FIG. 2, different chakras are tuned to different frequencies, e.g., 768 Hz for the crown, 528 Hz for the solar plexus, etc. A pair of frequencies may be selected to produce a beat pattern with a frequency that is a multiple of 528 Hz, which would affect the solar plexus chakra, the pancreas, or the practitioner's sight or movement. Similarly, various physical ailments are traditionally associated with different organs or chakras, and binaural beats may be selected to affect one or another organs or chakras to improve symptoms of disease associated with the organ or chakra.

In addition to chakra-based human energy systems, other more contemporary understandings of human energy systems may also be targeted for activation. For example, the brain operates on different frequencies during different times of day, and when performing different tasks. Specifically, the brain operates on theta delta, and gamma waves, among others. Theta waves are brain waves present in many animals that oscillate at the theta rhythm, a neural oscillation that is associated with learning, memory, spatial navigation, and other aspects of behavior and cognition. In humans, theta rhythms in the hippocampus are associated with memory formation, navigation, and REM sleep. Delta waves or rhythms are high amplitude neural oscillations having frequencies between 0.5 and 4 Hz, and are associated with stage three rapid eye movement (REM) sleep, i.e., slow wave sleep. Decreased delta wave activity in the brain is associated with inhibited physical and mental recovery, and low-quality sleep. Gamma waves or rhythms are a set of neural oscillations having frequencies between 25 and 140 Hz. Gamma rhythms are associated with large-scale brain network communication, working memory, attention, and perception.

In some embodiments, therefore, the disclosed invention tunes binaural beat frequencies to stimulate different types of brain wave activity. The beat frequency is tuned to stimulate the brain wave type selected by the user, e.g. theta wave activity in the brain is stimulated by causing binaural beats with a frequency of 4 to 7 Hz, hippocampal theta waves are stimulated by frequencies between 4 and 10 Hz, delta waves are stimulated by frequencies between 0.4 and 5 Hz, and gamma waves are stimulated by frequencies between 25 and 140 Hz. Meditative practice paired with binaural beat sound therapy within the respective frequency ranges can increase the type of brain wave activity associated with those frequency ranges.

In some embodiments, the disclosed meditation system includes a library of activation targets. Activation targets include both the energy system and the attributes associated with that energy system. For example, activation targets include traditional Tantric chakras, each of which has associated frequencies and colors. Chakra frequencies are activated by complementary binaural beat frequencies, while chakra colors are represented in the color of the mandala or mandala element. An activation target also includes one or more attributes associated with a chakra, such as a plant, an animal, an organ, a physical function, or mental state. For example, the brow chakra (see FIG. 2, item 220), also known as the third eye chakra, is associated with the frequency 720 Hz, the key of F and the color indigo. By selecting a binaural beat frequency in a multiple of 720 Hz, paired with a mandala with indigo color elements, a practitioner can activate or visualize attribute(s) associated with the brow chakra, such as the lotus flower, the unconscious mind, intuition, and/or communication.

Other activation targets include brain wave activation. For example, the gamma wave neural oscillation ranges from 25 to 140 Hz, and increased brain activity this frequency range is associated with improved perceptual grouping, attention, and working memory. Certain conditions are also associated with gamma wave irregularities, such as Alzheimer's, schizophrenia, and epilepsy. Therefore, a practitioner can select a binaural beat in this frequency range, e.g., 40 Hz, to improve their memory or attention skills, or to visualize mitigation of epilepsy symptoms. The activation get library serves as an organizing structure for the practitioner, who can select a chakra, a brain wave, a physical condition, or mental state they want to target for meditation practice. The application then suggests one or more corresponding binaural beat frequencies or other sound therapy works, and one or more corresponding mandalas or mandala elements to display in coordination with the sound therapy.

Binaural beat audio therapy is implemented through use of a smartphone, tablet, MP3 player, laptop, etc., configured to output multichannel audio through earphones, headphones, or speakers. Sound waves of different paired frequencies are played in each ear to produce the binaural beat perception at the selected beat frequency. Embodiments of the disclosed invention include a library sound files for producing binaural beats of various frequencies, and which are aimed at coordinating with a mandala, or affecting a chakra, brainwave, or other activation target. Such sound files may be specially constructed for binaural beat meditation therapy, may be existing musical or sonic works that are mixed to produce the binaural beat effect, or may simply be existing musical works having a tempo, dominant key, or tone that corresponds to an activation target. Sound files are configured to be played on stereo or multichannel audio output devices. The library of sound files can be curated by the practitioner according to preference. Multiple library configurations are possible and contemplated.

Coordinated Visual Therapy

The disclosed invention pairs binaural beat frequencies with coordinated rotating visual stimulation in the form of rotating mandala graphics. Because a Hertz is a cycle per second, it can be thought of as a rotational frequency, specifically the rotating frequency of a mandala or an individual layer of a mandala. The binaural beat frequency may be coordinated with the rotational speed(s) of a mandala by rotating the mandala or mandala elements) at one or more multiples of the binaural beat frequency. The rotating mandala graphic is thus made to create a visual representation of the binaural beat. While a practitioner listens to the binaural beats, the practitioner also watches the mandala displayed on a mobile device screen, a computer screen, or projected on a wall or other suitable surface. By pairing the audio and visual beat frequency effects, the practitioner is immersed in the energies acting upon the selected activation target. When practiced within a meditative structure, this immersive experience can improve achievement of the practitioner's desired results.

Figure 2:
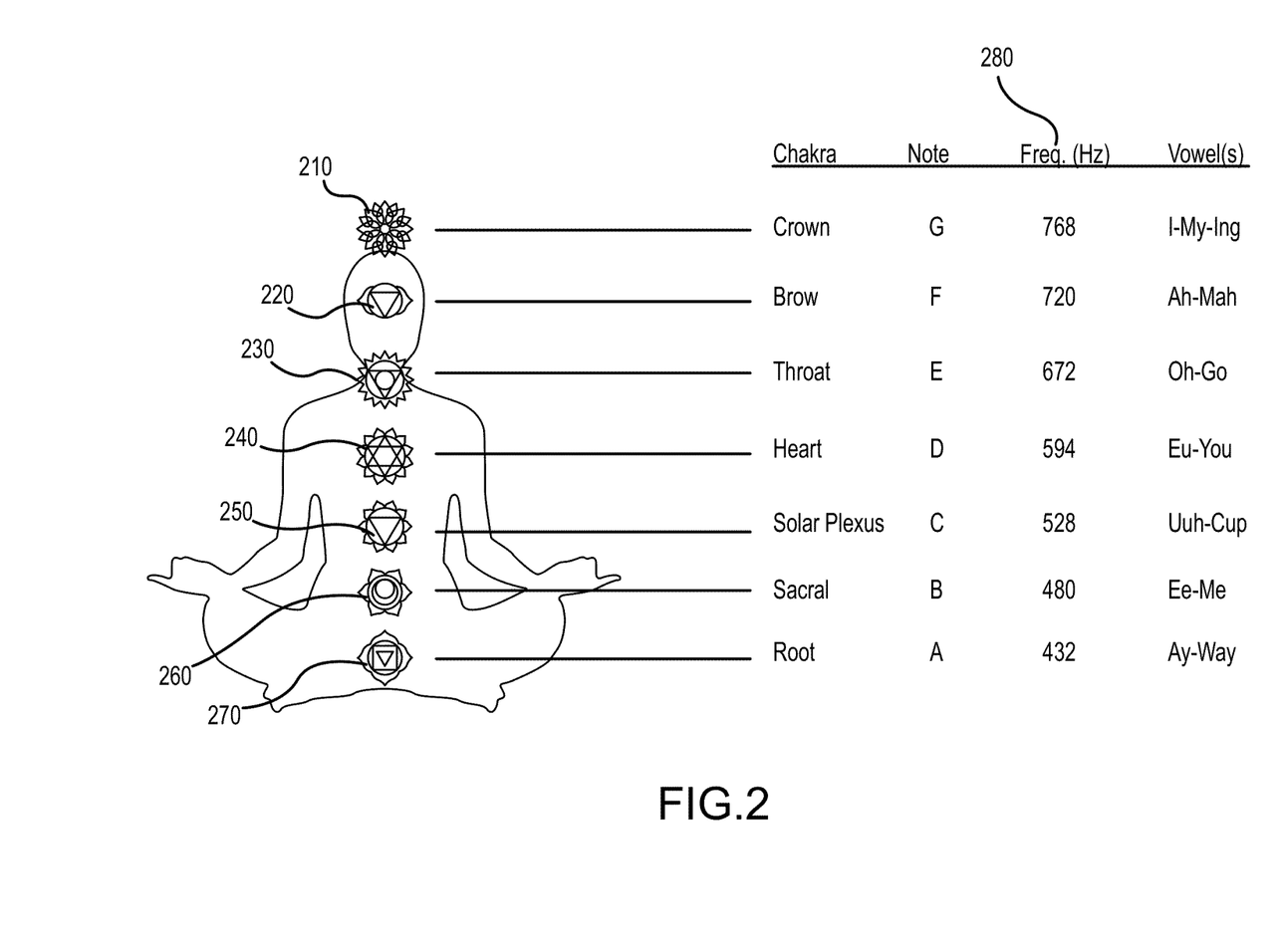
FIG. 2 depicts traditional chakra designations and characteristics, as used in some embodiments of the disclosed invention.

A mandala is a symbol with complex and interactive visual components. With reference to FIG. 2, there are mandalas for seven of the traditional chakras, including the crown 210, brow 220, throat 230, heart 240, solar plexus 250, sacral 260, and root 270 chakras. Other traditional chakras may also be included or substituted. Each mandala is selected for a particular purpose, i.e., to affect a particular chakra, a function, an organ, or a goal traditionally associated with that chakra. For example, a crown mandala 210 may be selected to affect the crown chakra, an organ associated with that chakra, i.e., the pituitary gland, or a function associated with that chakra, such as consciousness. Similarly, a throat mandala 230 may be selected to affect the throat chakra, the thyroid gland, or one of the functions traditionally associated with that chakra, such as purity or speaking. Custom mandalas may also be designed and selected based on a library of possible mandala components and visual elements. For example, a practitioner may design a mandala to represent their life through use of images incorporated in the mandala. As another example, the practitioner may make a 24-hour day mandala with imagery representing various daily activities. The meditation tool may also assist the practitioner to make custom mandalas by receiving input from the practitioner and accordingly designing a mandala with the requested elements as selected from the mandala component library.

Figure 3:
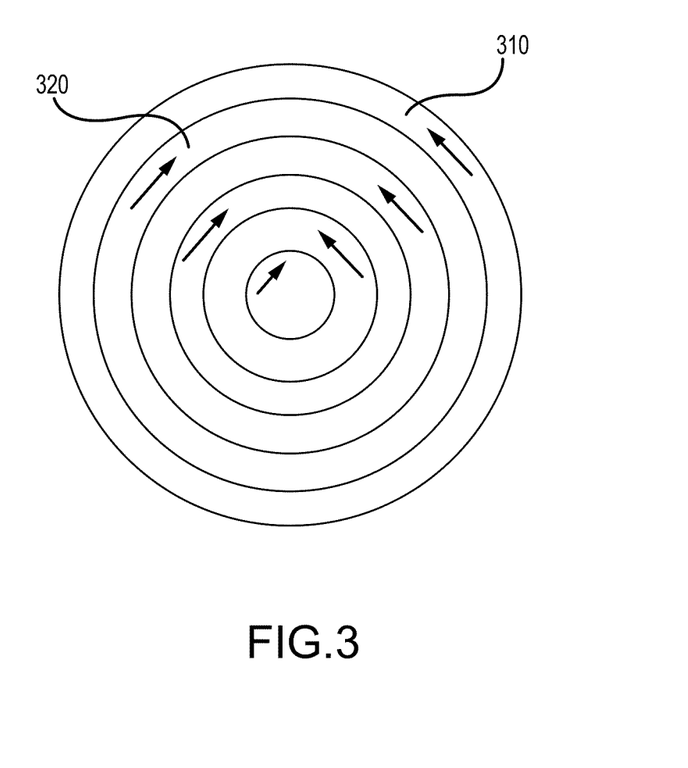
FIG. 3 depicts a mandala with representative rotational orientations, as used in some embodiments of the disclosed invention.
Figure 4A:
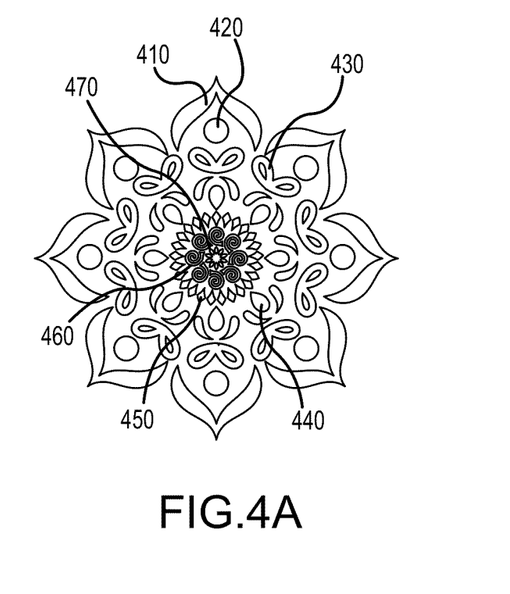
FIGS. 4A to 4D depict an example mandala with different rotational orientations, as used in some embodiments of the disclosed invention.
Figure 4B:
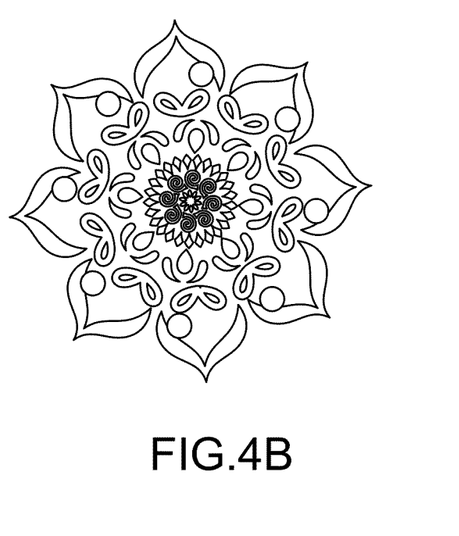
Figure 4C:
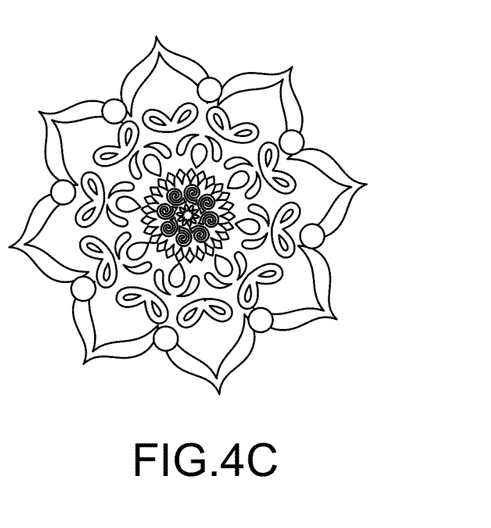
Figure 4D:
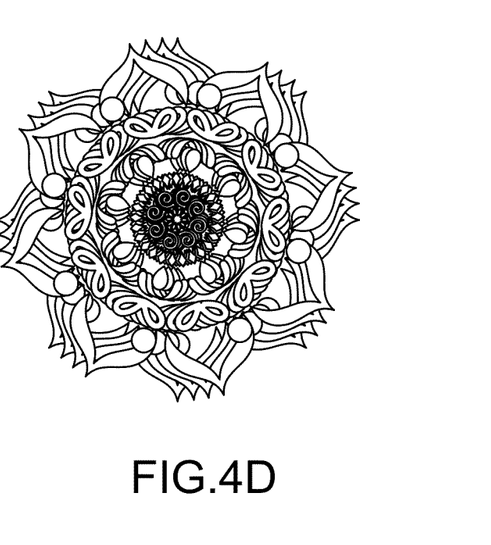

As used herein, mandalas are composed of a plurality of concentric circles or layers, e.g., six layers, each of which can rotate independently around the mandala center, which can also rotate. See FIG. 3. Adjacent layers rotate in the same direction or in opposite directions, e.g., the outermost layer 310 rotates counterclockwise, the next layer 320 rotates clockwise, and so on. With reference to FIGS. 4A to 4D, each layer of the mandala may have different repeating design elements and may be aimed at different activation targets. For example, with reference to FIG. 4A, the outermost layer 410 is a violet chevron design, the second layer 420 is a blue circle design, the third layer 430 is a cyan leaf design, the fourth layer 440 is a green flower design, the fifth layer 450 is a yellow teardrop design, the sixth layer 460 is an orange spiral design, and the center 470 is a red flower design. Note that in this example the colors mirror the colors of the visual spectrum as the layers move toward the center 470, and represent each of the seven chakras. With reference to FIG. 4B, the layers are rotated 5 degrees from their position in FIG. 4A, with the outer layer rotated 5 degrees counterclockwise, the next layer rotated 5 degrees clockwise, and so on. FIG. 4C is similarly rotated 10 degrees per layer. FIG. 4D is a composite of the mandala as it would look rotated several iterations. In other cases, a mandala and all of its individual layers may be aimed at a single activation target. By rotating the mandala's layers at selected rates, various visual patterns are established that assist in meditative practice. Each visual representation of a mandala will have natural rotational frequencies, similar to resonant frequencies recognized in the field of cymatics. Once the mandala and its individual layers are correlated to their natural rotation frequencies, the mandala can be paired with audio stimulus containing binaural beats with a corresponding frequency, or range of frequencies, that activate a given target.

With further reference to FIG. 2, frequencies 280 associated with various chakras are displayed. When a mandala is rotated at one of the listed frequencies, it produces a meditative effect on the corresponding chakra. For example, rotating the mandala at 720 Hz or a multiple of that frequency may have a meditative effect on the brow chakra 220 of a practitioner. Similarly, spinning the mandala at 480 Hz may affect the practitioner's sacral chakra 260, and so on. Since the human eye can only register rotation speeds up to around 120 Hz, spinning a mandala at rates in the range of frequencies shown in FIG. 2, establishes an optical illusion effect on the practitioner wherein the mandala can appear to stand nearly still, or show various other animated effects such as harmonization points. In some embodiments, these optical illusions are manipulated to correspond to a binaural beat frequency, a chakra, or other target for activation.

The disclosed meditative system pairs the mandala's rotation scheme with audio therapy, e.g., a binaural beat frequency created in the practitioner's headphones. As the mandala's appearance and rotational speed are adjusted to achieve different effects, the system can select music that has a complimentary key, frequency, or tempo to enhance the visual effect of the spinning mandala. Similarly, if a binaural beat is used, the binaural beat frequency can be paired with spin rate(s) of the mandala or mandala layer(s) to achieve a desired meditative effect for a practitioner, such as developing a more effective method of time management. For example, if the mandala is rotated at a certain rate so that the practitioner sees a certain harmonization point, and that harmonization point has a meditative effect on the practitioner, the system could pair the visual presentation with an audio work that produces a binaural beat having the same or a complimentary frequency. The practitioner could therefore begin to subconsciously alter their behavior to achieve the goals of the meditative session, such as improved concentration. By pairing the visual and auditory frequencies, the effect of the meditation on the practitioner is enhanced.

Graphical User Interface

Figure 5:
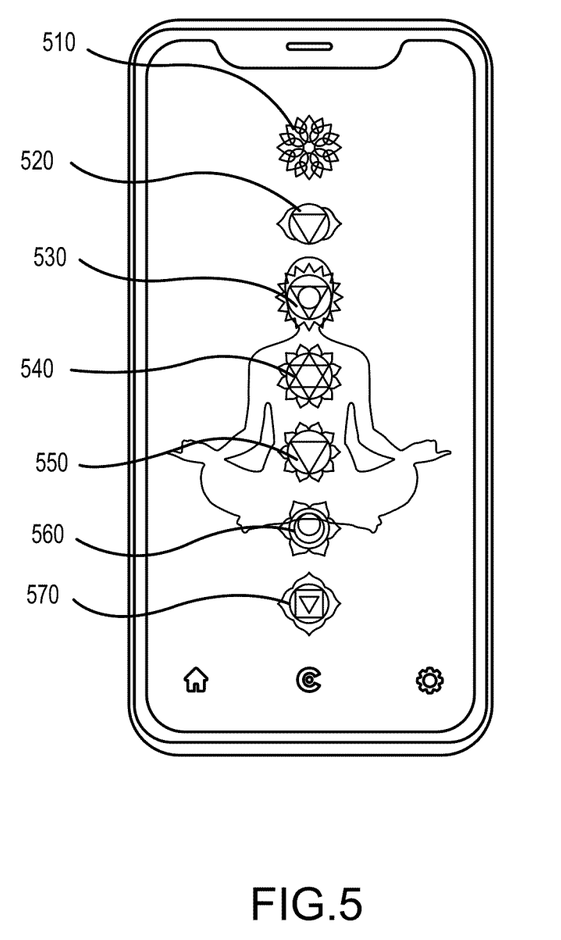
FIG. 5 depicts an example graphical user interface, as used in some embodiments of the disclosed invention.
Figure 6:
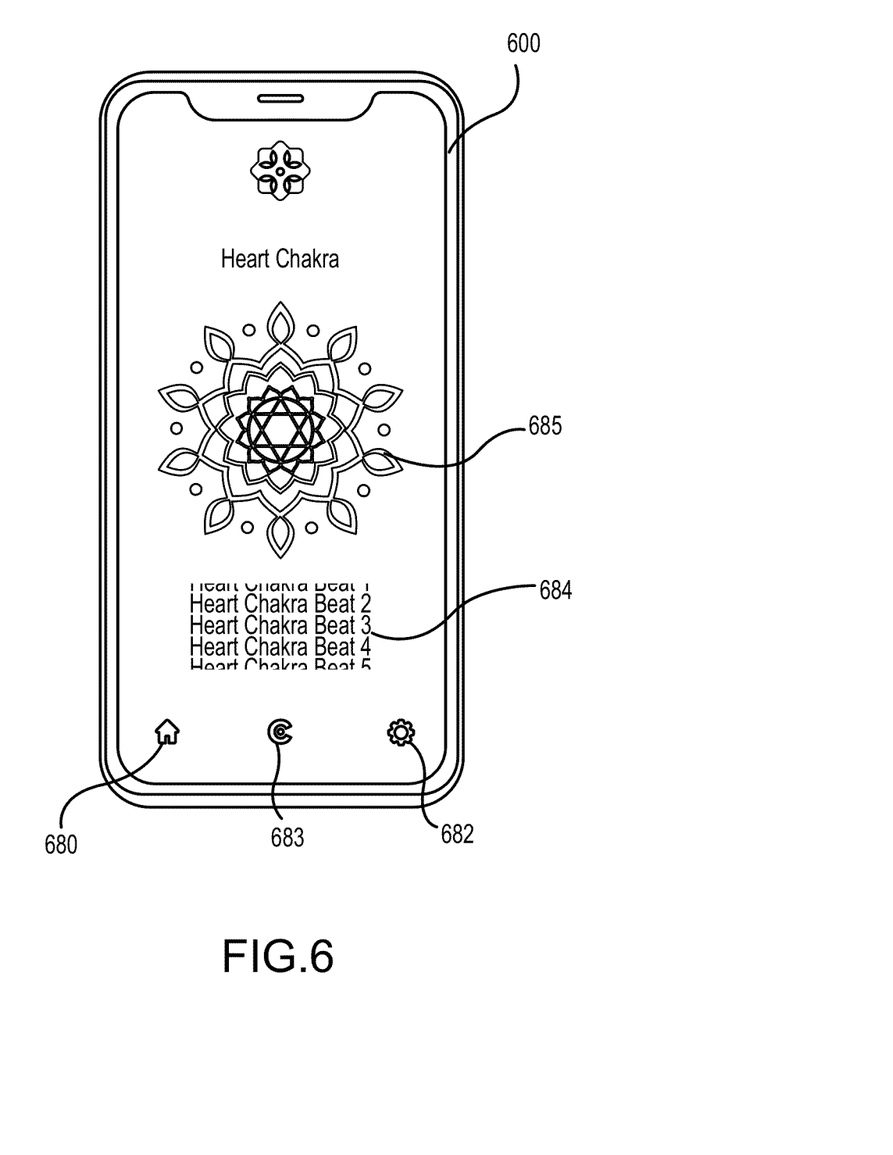
FIG. 6 depicts an example graphical user interface, as used in some embodiments of the disclosed invention.

The disclosed meditation system is implemented through a mobile software application (app) that can be executed on a smartphone, tablet, laptop, or other suitable computing device with visual display. With reference to FIG. 5, a graphical user interface (GUI) 500 displays mandalas 510, 520, 530, 540, 550, 560, 570 representing different chakra activation targets. To begin a meditation program, a practitioner would select a mandala corresponding to the program they would like to complete. For example, the practitioner selects the heart chakra mandala 540 to perform guided meditation aimed at activating the heart chakra, and intended to improve balance, calmness, serenity, or other attribute traditionally associated with the heart chakra. With reference to FIG. 6, a GUI 600 showing several heart chakra programs is depicted. The GUI includes a Home button 680, which when pressed returns the user to a home screen, a Settings button 682, which brings up a settings menu, a Play button 683, which alternately plays and stops audio-visual stimulus, a Beat Program Selector 684, which allows the user to select one of a number of different beat programs corresponding to the selected chakra, and a mandala 685 aimed at influencing the heart chakra or an attribute of the heart chakra. The Beat Program Selector 684 offers several different binaural beat audio works that can be used along with the mandala. The mandala 685 is comprised of two or more layers or concentric circles (six are shown) that rotate around the mandala's center point at rates that compliment the selected beat program. Each layer can rotate at its own rate and can turn either clockwise or counterclockwise to achieve a visual effect. The colors of the mandala 685 are in the range of the selected chakra, in this case shades of green, which is a color traditionally associated with the heart chakra. Each layer is a different shade of green to allow the user to differentiate among the layers. Once the activation target chakra and audio work are selected, the guided meditation program is presented to the user with the mandala or mandala elements rotating in coordination with the selected binaural beat.

Figure 7:
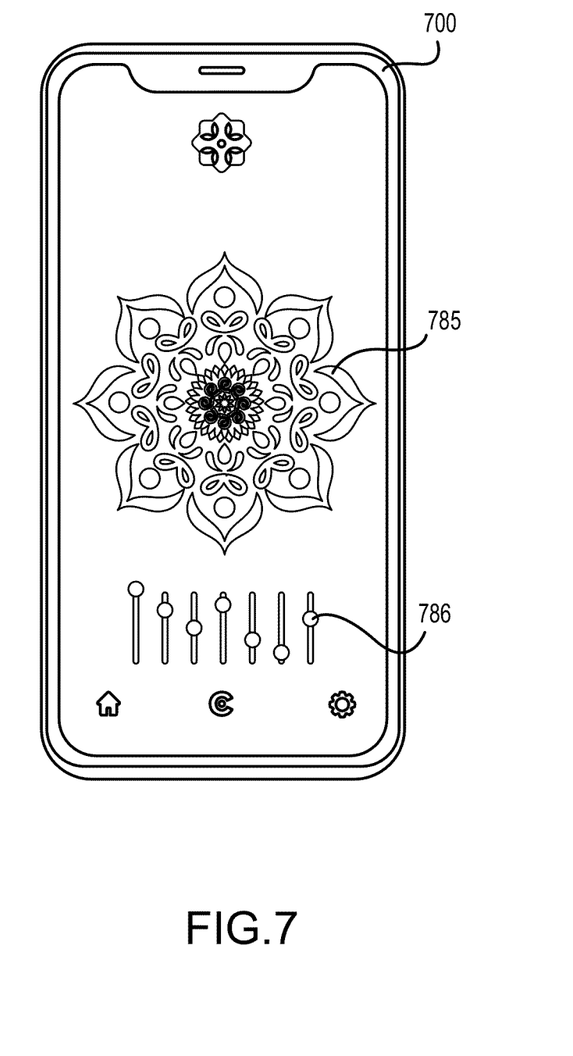
FIG. 7 depicts an example graphical user interface, as used in some embodiments of the disclosed invention.

In addition to set programs of guided meditation, the disclosed invention also allows highly customizable meditation experiences. With reference to FIG. 7, an example custom mandala 785 is shown. The depicted mandala is not limited to the colors of a particular chakra, but is based on the preferences of the user. In this case, each layer of the mandala 785 is shaded to represent a different chakra so that all seven chakras are represented. A user may create a custom mandala using layers from a library of mandala forms and colors, may select an entire mandala from among a library of mandalas, or may create and use their own mandala or mandala layer designs. Similarly, a user may also customize their audio experience. Users can select from a library of music and binaural beat programs, or users can add their own chosen or created audio works to the sound file library to play along with their custom mandalas.

In some embodiments, the custom mandala GUI 700 includes an Equalizer 786. Each slider in the equalizer represents a different layer of the mandala, and is shaded to correspond with the controlled layer. By moving the different sliders, the thickness and complexity of the layers can be controlled, e.g., moving a slider toward the top makes the corresponding layer thicker and/or more complex or ornate, and moving the slider toward the bottom makes the layer thinner and/or less complex. In some embodiments, an Equalizer 786, having more or fewer sliders than depicted, is configured to control audio therapy. In such embodiments, each slider corresponds to a layer of the audio track played with the mandala. Moving a slider toward the top increases the emphasis and/or volume of the corresponding audio track, while moving the slider toward the bottom reduces the influence and/or volume of the corresponding audio track. The custom mandala GUI may also include a Beat Program Selector, see FIG. 6, item 684, so that the user can associate audio works with their custom mandala.

Figure 8:
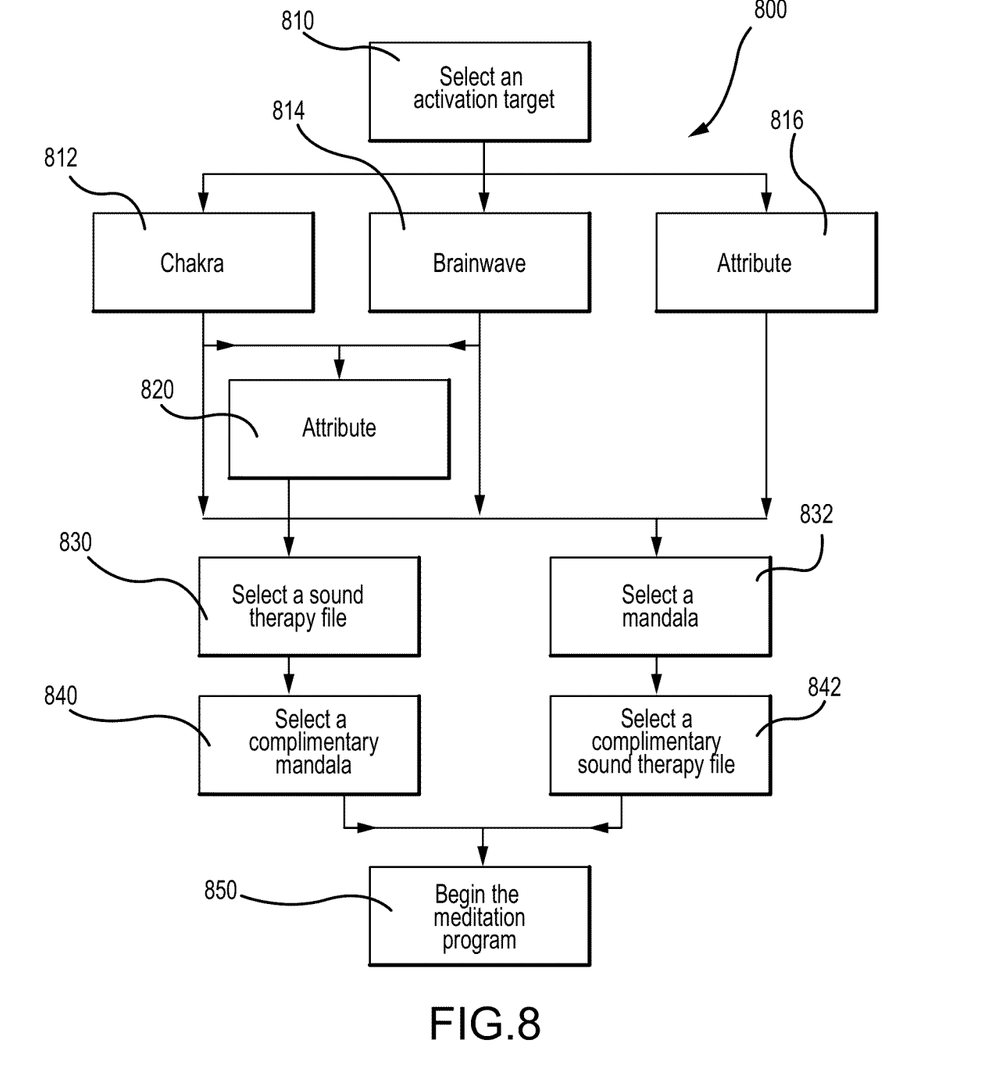
FIG. 8 depicts an example decision tree diagram showing the selection of a meditation program as used in some embodiments of the disclosed invention.

With reference to FIG. 8 is depicted an example decision tree diagram 800 showing the selection of a meditation program according to embodiments of the disclosed invention. An application user may start by selecting an activation target 810 within the app. The user can choose among the various activation targets stored in the app's activation target library. The user may accordingly choose to activate a particular chakra 812 or to activate a type of brainwave 814. Once the chakra or brainwave type is selected, the app presents the user with the subset of available attributes 820 that are associated with the selected chakra or brain wave. Alternatively, the user may bypass selecting a specific attribute and progress to the selection of a sound therapy file or mandala. As another alternative, the user may begin by selecting from all available attributes 816. Next the user may select a sound therapy file 830 from a subset of the sound file library that includes sound files that act upon the selected attribute. Once the sound file is selected, the user chooses a complementary mandala 840 from a subset of the mandala library. Alternatively, the user may select a mandala 832 from a subset of the mandala library that includes mandalas that act upon the selected attribute. With the mandala selected, the user selects a complementary sound therapy file 842. With all of the elements selected, the user can begin the meditation program 850. While the present example begins meditation program selection by choosing an activation target, the app user may also start with a sound therapy file or a mandala, and assemble a program from there.

Included in the description are flowcharts and block diagrams depicting examples of the methodology and components which may be used to provide automated decision-making In the following description, it will be understood that each block of such illustrations, and combinations of blocks in such illustrations, can be implemented by computer program instructions. These computer program instructions may be loaded onto a computer or other programmable apparatus to produce a machine such that the instructions that execute on the computer or other programmable apparatus create means for implementing the functions specified in the illustration block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the illustration block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the illustration block or blocks.

Accordingly, blocks of the flowchart and block diagram illustrations support combinations of means for performing the specified functions and/or combinations of steps for performing the specified functions. It will also be understood that each block of the illustrations, and combinations of blocks in the illustrations, can be implemented by general or special purpose hardware-based computer systems that perform the specified functions or steps, or combinations of hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Computing System

Figure 9:
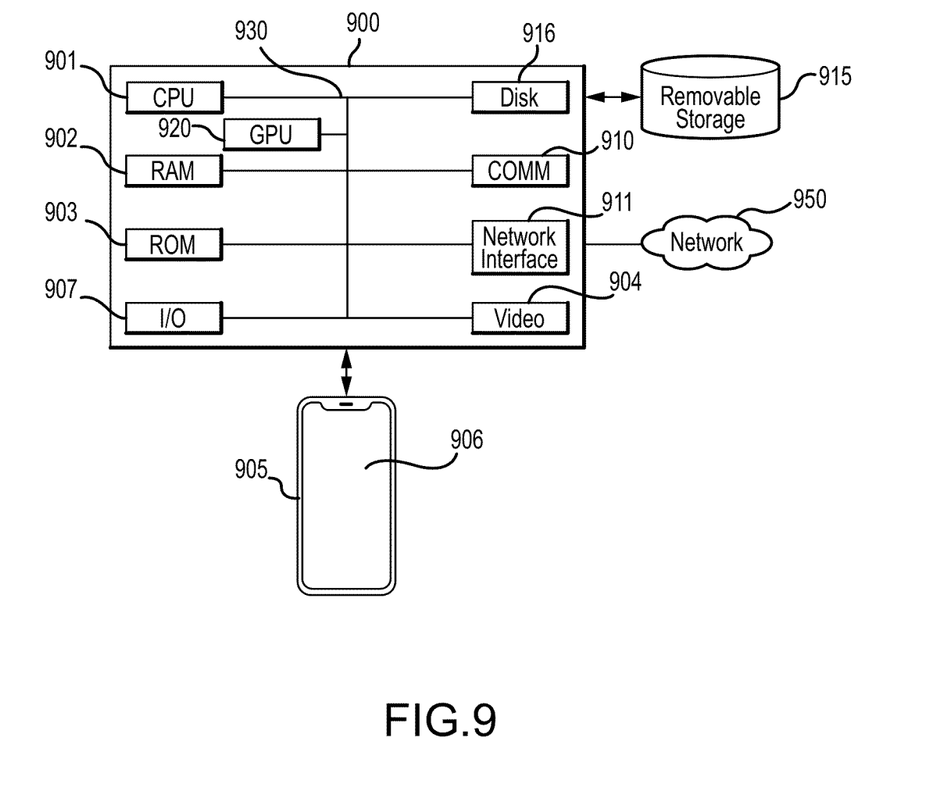
FIG. 9 depicts a block diagram of an exemplary general computer system, as used in some embodiments of the disclosed invention.

One of reasonable skill will recognize that portions of the disclosed invention may be implemented on a conventional or general-purpose computing system, such as a general-purpose computer, a mobile device, a notebook computer, tablet, or the like. FIG. 9 is a general block diagram of a computer system in which software-implemented processes of the present invention may be embodied. As shown, system 900 comprises a central processing unit(s) (CPU) or processor(s) 901 coupled to a random-access memory (RAM) 902, a graphics processor unit(s) (GPU) 920, a read-only memory (ROM) 903, a touchscreen or other suitable user interface 906, a display or video adapter 904 connected to a display device 905, a removable (mass) storage device 915 (e.g., cloud memory, flash drive, or the like), a fixed (mass) storage device 916 (e.g., flash memory, or hard disk), a communication (COMM) port(s) or interface (s) 910, and a network interface card (NIC) or controller 911 (e.g., Ethernet, wi-fi, cellular). Although not shown separately, a real time system clock is included with the system 900, in a conventional manner.

The CPU 901 comprises a suitable processor for implementing the present invention. The CPU 901 communicates with other components of the system via a bi-directional system bus 930 (including any necessary input/output (I/O) controller 907 circuitry and other "glue" logic). The bus, which includes address lines for addressing system memory, provides data transfer between and among the various components. Random-access memory 902 serves as the working memory for the CPU 901. The read-only memory (ROM) 903 contains the basic input/output system code (BIOS), a set of low-level routines in the ROM that application programs and the operating systems can use to interact with the hardware, including reading characters from the keyboard, outputting characters to printers, and so forth.

Mass storage devices 915, 916 provide persistent storage on fixed and removable media, such as magnetic, optical, or magnetic-optical storage systems, flash memory, cloud storage, or any other available mass storage technology. The mass storage may be shared on a network 950, or it may be a dedicated mass storage. As shown in FIG. 9, fixed storage 916 stores a body of program and data for directing operation of the computer system, including an operating system, user application programs, driver, and other support files, as well as other data files of all sorts. Typically, the fixed storage 916 serves as the main memory for the system.

In basic operation, program logic (including that which implements methodology of the present invention described herein) is loaded from the removable storage 915 or fixed storage 916 into the main (RAM) memory 902, for execution by the CPU 901 and or GPU 920. During operation of the program logic, the system 900 accepts user input from a touchscreen 906, a keyboard, and/or a pointing device, as well as speech-based input from a voice recognition system (not shown). The user interface permits selection of application programs, entry of keyboard-based input or data, and selection and manipulation of individual data objects displayed on the screen or display device 905. Likewise, the pointing device, such as a mouse, track ball, pen device, touch screen, or the like, permits selection and manipulation of objects on the display device. In this manner, these input devices support manual user input for any process running on the system.

The computer system 900 displays text and/or graphic images and other data on the display device 905. The video adapter 904, which is interposed between the display 905 and the system's bus, drives the display device 905. The video adapter 904, which includes video memory accessible to the CPU 901, provides circuitry that converts pixel data stored in the video memory to a raster signal suitable for use by a retina display, a liquid crystal display (LCD), or other suitable monitor. In some embodiments, the computer system may send visual output to be projected or displayed on a television, a projector screen, a theater screen, a wall, etc., for use by large groups of users. The computer system 900 produces multichannel audio output through connected wired or wireless headphones, earphones, earbuds, surround sound, home stereo, or other suitable system configured to provide stereo audio to a user.

The system itself communicates with other devices (e.g., other computers, monitors, speakers) via the network interface card (NIC) 911 connected to a network (e.g., cellular, Ethernet network, wi-fi, Bluetooth, or the like). The system 900 may also communicate with local occasionally connected devices (e.g., serial cable-linked devices) via the communication (COMM) interface 910, which may include a serial port, a Universal Serial Bus (USB) interface, or the like. Devices that will be commonly connected locally to the COMM interface 910 include laptop computers, handheld organizers, digital cameras, and the like.

The system may be implemented through various wireless networks and their associated communication devices. Such networks may include modems, mainframe computers, or servers, such as a gateway computer or application server which may have access to a database. A gateway computer serves as a point of entry into each network and may be coupled to another network by means of a communications link. The gateway may also be directly or indirectly coupled to one or more devices using a communications link, or may be coupled to a storage device such as cloud storage, a data repository, or database.

Although several processes have been disclosed herein as software, it may be appreciated by one of skill in the art that the same processes, functions, etc. may be performed via hardware or a combination of hardware and software. Similarly, although the present invention has been depicted as a wireless system, these concepts may be applied to hardwired systems and hybrid hardwired and wireless systems without departing from the scope of the present invention.

As will be understood by those familiar with the art, the disclosed invention may be embodied in other specific forms without departing from the spirit or essential characteristics thereof. Likewise, the particular naming and division of the modules, managers, functions, systems, layers, features, attributes, methodologies, and other aspects are not mandatory or significant, and the mechanisms that implement the invention or its features may have different names, divisions, and/or formats. Accordingly, the disclosure of the present invention is intended to be illustrative, but not limiting, of the scope of the invention.

What is claimed is:

1. A multimedia system for meditation practice, the system comprising:
   a graphical user interface;
   a multichannel audio output device;
   memory configured to store instructions that are executable on a computer;
   a computer processor configured to access memory and execute the instructions to:
   access a library of graphics files, each graphics file including a mandala graphic;
   access a library of sound files, each sound file including an audio work having a beat frequency;
   access a library of activation target files, each target file including a target for meditation practice;
   wherein each target file is associated with one or more graphics file(s) and one or more sound file(s);
   receive from a user a selected target;
   determine one or more associated graphics files and one or more associated sound files based on the selected target;
   receive from the user a selected mandala graphic from the one or more associated graphics files;
   receive from the user a selected audio work from the one or more associated sound files;
   generate a meditation program wherein the program includes the selected mandala graphic, and the selected audio work;
   present the meditation program, wherein the selected audio work is played on the audio output device, and the selected mandala graphic is displayed on the graphical user interface, and wherein the selected mandala graphic rotates at a rate, the rate being a multiple of the beat frequency of the selected audio work.

2. The system of claim 1, wherein the library of graphics files further includes a library of mandala element files, each mandala element file including a custom mandala element; and
   the computer processor further configured to access memory and execute the instructions to:
   receive from the user a custom mandala assembled from one or more custom mandala elements;
   create a custom graphics file for the custom mandala; and
   associate the custom graphics file with a target file.

3. The system of claim 1, the library of sound files further comprising one or more music files, wherein each of the one or more music files is associated with a target file or a graphics file.

4. The system of claim 1, wherein the library of target files includes one or more activation target types: a chakra target, a brain wave target, and an attribute target, the attribute target including an organ target, an animal target, a plant target, a behavioral state target, a physical state target, and an emotional state target, and wherein each target for meditation practice is associated with an activation target type.

5. The system of claim 4, wherein the chakra target includes a crown, a brow, a throat, a heart, a solar plexus, a sacral, and a root.

6. The system of claim 4, wherein the brain wave target includes a theta, a hippocampus theta, a gamma, and a delta.

7. The system of claim 1, wherein the selected mandala graphic includes a plurality of elements, and wherein each of the plurality of elements rotates at an element rate and an element direction, the element direction being one of a clockwise rotation or a counterclockwise rotation.

8. The system of claim 7, wherein the element rate is a frequency resonant to the beat frequency.

9. The system of claim 1 wherein the rate establishes a harmonization point.

10. The system of claim 1, wherein the graphical user interface is displayed on one of a television, a projector screen, a theater screen, or a wall, and the audio output device is one of a surround sound system, or a home stereo system.

11. A method for meditation practice, comprising:
displaying by a computer processor and a graphical user interface, a plurality of icons, each icon representing an activation target;
prompting a user to select a selected icon from the plurality of icons;
receiving from the user the selected icon;
accessing a target file corresponding to the selected icon;
determining one or more associated graphics files and one or more associated sound files that are associated with the target file;
displaying a mandala graphic from each of the one or more associated graphics files, and an audio work from each of the one or more associated sound files;
prompting the user to select a selected mandala graphic from the one or more associated graphics files, and to select a selected audio work from the one or more associated sound files;
receiving from the user the selected mandala graphic and the selected audio work;
generating a meditation program wherein the program includes the selected mandala graphic, and the selected audio work;
presenting the meditation program, wherein the selected audio work is played on an audio output device, and the selected mandala graphic is displayed on the graphical user interface, and wherein the selected mandala graphic rotates at a rate, the rate being a multiple of a beat frequency of the selected audio work.

12. The method of claim 11, further comprising mandala element files, each mandala element file including a custom mandala element; and
displaying by a computer processor and a graphical user interface, a plurality of mandala elements;
prompting the user to select one or more selected mandala elements from the plurality of mandala elements and to construct a custom mandala from the one or more selected mandala elements;
receiving from the user the custom mandala;
creating a custom graphics file for the custom mandala; and
associating the custom graphics file with a target file.

13. The method of claim 11, wherein the audio work is a musical work.

14. The method of claim 11, wherein the plurality of icons includes a crown icon that corresponds to a crown chakra target file, a brow icon that corresponds to a brow chakra target file, a throat icon that corresponds to a throat chakra target file, a heart icon that corresponds to a heart chakra target file, a solar plexus icon that corresponds to a solar plexus chakra target file, a sacral icon that corresponds to a sacral chakra target file, and a root icon that corresponds to a root chakra target file.

15. The method of claim 11, wherein the plurality of icons includes a theta icon corresponding to a theta wave target file, a hippocampus theta icon corresponding to a hippocampus theta wave target file, a gamma icon corresponding to a gamma wave target file, and a delta icon corresponding to a delta wave target file.

16. The method of claim 11, further comprising a plurality of attribute targets, the plurality of attribute targets including an organ target, an animal target, a plant target, a behavioral state target, a physical state target, and an emotional state target.

17. The method of claim 11, wherein the selected mandala graphic includes a plurality of elements, and wherein each of the plurality of elements rotates at an element rate and an element direction, the element direction being one of a clockwise direction or a counterclockwise direction.

18. The method of claim 17, wherein the element rate is a frequency resonant to the beat frequency.

19. The method of claim 11 wherein the rate establishes a harmonization point.

20. The method of claim 11, wherein the graphical user interface is displayed on one of a television, a projector screen, a theater screen, or a wall, and the audio output device is one of a surround sound system, or a home stereo system.

* * * * *